United States Patent
Chen et al.

(10) Patent No.: US 11,009,831 B2
(45) Date of Patent: May 18, 2021

(54) BACKLIGHT MODULE, SPATIAL LIGHT MODULATOR, HOLOGRAPHIC DISPLAY DEVICE AND HOLOGRAPHIC DISPLAY METHOD THEREFOR

(71) Applicant: BOE Technology Group Co., Ltd., Beijing (CN)

(72) Inventors: Hao Chen, Beijing (CN); Bingchuan Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 606 days.

(21) Appl. No.: 15/705,451

(22) Filed: Sep. 15, 2017

(65) Prior Publication Data
US 2018/0224803 A1    Aug. 9, 2018

(30) Foreign Application Priority Data
Feb. 6, 2017   (CN) .......................... 201710067345.2

(51) Int. Cl.
*G03H 1/22* (2006.01)
*G02F 1/1343* (2006.01)
(Continued)

(52) U.S. Cl.
CPC ........... *G03H 1/2286* (2013.01); *G02B 30/00* (2020.01); *G02F 1/1343* (2013.01);
(Continued)

(58) Field of Classification Search
CPC ...... G03H 1/22; G03H 1/2286; G03H 1/2294; G03H 1/0408; G03H 1/2249;
(Continued)

(56) References Cited

U.S. PATENT DOCUMENTS 9,618,903 B2    4/2017  Choi et al.
9,720,375 B2    8/2017  Yoon et al.
(Continued)

FOREIGN PATENT DOCUMENTS

CN    202487668 U    10/2012
CN    103116228 A    5/2013
(Continued)

OTHER PUBLICATIONS

First Office Action, including Search Report, for Chinese Patent Application No. 201710067345.2, dated Apr. 25, 2019, 25 pages.

*Primary Examiner* — Collin X Beatty
*Assistant Examiner* — Grant A Gagnon
(74) *Attorney, Agent, or Firm* — Westman, Champlin & Koehler, P.A.

(57) ABSTRACT

A backlight module, a spatial light modulator, a holographic display device and a holographic display method therefor are disclosed. The backlight module includes: a light source; an optical conversion element arranged to face the light source and configured to convert a light beam emitted by the light source into coherent collimated light; and a light switch layer disposed at a side of the optical conversion element away from the light source. The optical conversion element includes a plurality of sub-optical conversion regions. The light switch layer includes a plurality of sub-light switches, the plurality of sub-light switches and the plurality of sub-optical conversion regions being disposed in one-to-one correspondence.

20 Claims, 6 Drawing Sheets

(51) Int. Cl.
*G02F 1/1335* (2006.01)
*G02F 1/13357* (2006.01)
*G02B 30/00* (2020.01)
*G02B 27/01* (2006.01)

(52) U.S. Cl.
CPC ..... *G02F 1/133602* (2013.01); *G03H 1/2294* (2013.01); *G02B 27/0103* (2013.01); *G03H 2222/20* (2013.01); *G03H 2222/53* (2013.01); *G03H 2223/19* (2013.01)

(58) Field of Classification Search
CPC .. G03H 2210/30; G03H 2222/34; G03H 1/08; G03H 1/26; G03H 2001/2231; G03H 2222/22; G03H 1/16; G03H 1/2205; G03H 2001/221; G03H 2001/2223; G03H 2001/2234; G03H 2001/2236; G03H 2001/2242; G03H 2210/20; G03H 2226/05; G03H 2250/42; G03H 1/04; G03H 1/0866; G03H 1/268; G03H 2001/0413; G03H 2001/0858; G03H 2001/2263; G03H 2001/2271; G03H 2001/2278; G03H 2210/22; G03H 2223/12; G03H 2223/19; G03H 2225/55; G03H 2227/06; G03H 2270/21; G03H 1/00; G03H 1/0005; G03H 1/0011; G03H 1/02; G03H 1/0236; G03H 1/0244; G03H 1/0248; G03H 1/0256; G03H 1/028; G03H 1/0465; G03H 1/24; G03H 1/265; G03H 2001/005; G03H 2001/0061; G03H 2001/0415; G03H 2001/0417; G03H 2001/0419; G03H 2001/0421; G03H 2001/0456; G03H 2001/0473; G03H 2001/048; G03H 2001/0883; G03H 2001/2226; G03H 2001/2244; G03H 2001/2247; G03H 2001/226; G03H 2001/2289; G03H 2001/2297; G03H 2001/306; G03H 2222/13; G03H 2222/18; G03H 2222/20; G03H 2222/23; G03H 2222/24; G03H 2223/14; G03H 2223/16; G03H 2225/11; G03H 2225/52; G03H 2225/60; G03H 2227/02; G03H 2240/51; G03H 2250/10; G03H 2270/12; G02B 5/32; G02B 27/0944; G02B 27/2214; G02B 27/2235; G02B 27/2242; G02B 5/1876; G02B 5/1885; G02B 23/00; G02B 26/005; G02B 27/025; G02B 3/14; G02B 5/06; G02B 5/3083; G02F 1/133605; G02F 1/133615
USPC .......................................................... 359/32
See application file for complete search history.

(56) References Cited

U.S. PATENT DOCUMENTS

| | | |
|---|---|---|
| 2013/0120817 A1 | 5/2013 | Yoon et al. |
| 2014/0293386 A1 | 10/2014 | Choi et al. |
| 2016/0320640 A1 | 11/2016 | Han et al. |
| 2018/0067456 A1 | 3/2018 | Zhang et al. |

FOREIGN PATENT DOCUMENTS

| | | |
|---|---|---|
| CN | 104076674 A | 10/2014 |
| CN | 106292240 A | 1/2017 |

BACKLIGHT MODULE, SPATIAL LIGHT MODULATOR, HOLOGRAPHIC DISPLAY DEVICE AND HOLOGRAPHIC DISPLAY METHOD THEREFOR

CROSS-REFERENCE TO RELATED APPLICATION

This application claims the benefit of Chinese Patent Application No. 201710067345.2 filed on Feb. 6, 2017 in the State Intellectual Property Office of China, the disclosure of which is incorporated in entirety herein by reference.

BACKGROUND

Technical Field

Embodiments of the present disclosure relate to a field of display technology, and more particularly, to a backlight module, a spatial light modulator, a holographic display device and a holographic display method therefor.

Description of the Related Art

With the continuous development of display technology, more requirements on display quality and effect are raised. In view of this, three-dimensional display technology has gradually become a research and development focus. Compared with the traditional two-dimensional display technology, the three-dimensional display technology can display more real, more stereoscopic pictures, thus it on one hand can improve people's audio-visual enjoyment, and on the other hand can improve accuracy and efficiency of information acquisition, processing, transmission and human-computer interaction.

At present, the three-dimensional display technology may mainly be divided into: stereoscopic three-dimensional display technology, auto-stereo three-dimensional display technology, spatial three-dimensional display technology and holographic three-dimensional display technology. The holographic three-dimensional display technology utilizes optical interference principle to record specific light waves emitted by an object in form of interference fringes, and then utilizes optical diffraction principle to restore the light waves of the object under certain conditions, thereby presenting a three-dimensional holographic image.

SUMMARY

In at least one embodiment of the present disclosure, there is provided a backlight module, comprising:
a light source;
an optical conversion element arranged to face the light source and configured to convert a light beam emitted by the light source into coherent collimated light; and
a light switch layer disposed at a side of the optical conversion element away from the light source,
wherein the optical conversion element comprises a plurality of sub-optical conversion regions, the light switch layer comprises a plurality of sub-light switches, the plurality of sub-light switches and the plurality of sub-optical conversion regions being disposed in one-to-one correspondence.

As an example, in the backlight module according to an embodiment of the present disclosure, the light switch layer is attached to the side of the optical conversion element away from the light source.

As an example, in the backlight module according to an embodiment of the present disclosure, the plurality of sub-optical conversion regions are arranged in an array in the optical conversion element, and the plurality of sub-light switches are arranged in an array in the light switch layer.

As an example, in the backlight module according to an embodiment of the present disclosure, the sub-light switch comprises:
a first electrode;
a second electrode; and
an optical film layer disposed between the first electrode and the second electrode and configured to be in an opaque state or in a transparent state under an action of an electric field between the first electrode and the second electrode.

As an example, in the backlight module according to an embodiment of the present disclosure, the optical film layer comprises at least one of a liquid crystal layer and an electrochromic layer.

As an example, in the backlight module according to an embodiment of the present disclosure, the liquid crystal layer comprises polymer dispersed liquid crystals.

As an example, in the backlight module according to an embodiment of the present disclosure, the first electrode is a transparent electrode and the second electrode is a transparent electrode.

As an example, in the backlight module according to an embodiment of the present disclosure, the sub-light switch further comprises a first lead and a second lead, connected to the first electrode and the second electrode respectively and configured to apply voltages to the first electrode and the second electrode respectively.

As an example, in the backlight module according to an embodiment of the present disclosure, the optical conversion element comprises at least one of a planar light guide plate and a lens array.

In at least one embodiment of the present disclosure, there is provided a spatial light modulator having a light entrance side, comprising:
a plurality of sub-spatial light modulators; and
a light switch layer disposed at the light entrance side of the spatial light modulator,
wherein the light switch layer comprises a plurality of sub-light switches, the plurality of sub-light switches and the plurality of sub-optical conversion regions being disposed in one-to-one correspondence, and the light switch layer is attached to the light entrance side of the spatial light modulator.

In at least one embodiment of the present disclosure, there is provided a holographic display device, comprising:
a spatial light modulator comprising a plurality of sub-spatial light modulators; and
a backlight module arranged to face the spatial light modulator and configured to emit coherent collimated light to the spatial light modulator,
wherein the backlight module is the backlight module according to the above embodiments, and the plurality of sub-spatial light modulators and the plurality of sub-optical conversion regions being disposed in one-to-one correspondence.

As an example, in the holographic display device according to an embodiment of the present disclosure, the light switch layer is attached to the side of the optical conversion element away from the light source.

As an example, in the holographic display device according to an embodiment of the present disclosure, the sub-light switch comprises:

a first electrode;

a second electrode; and an optical film layer disposed between the first electrode and the second electrode and configured to be in an opaque state or in a transparent state under an action of an electric field between the first electrode and the second electrode.

As an example, in the holographic display device according to an embodiment of the present disclosure, the holographic display device further comprises a deflection system disposed at a side of the spatial light modulator away from the backlight module and configured to deflect a holographic reconstruction light beam diffracted by the plurality of sub-spatial light modulators into a same display space.

In at least one embodiment of the present disclosure, there is provided a holographic display device, comprising:

a spatial light modulator; and a backlight module comprising an optical conversion element which comprises a plurality of sub-optical conversion regions, wherein the spatial light modulator is the spatial light modulator according to the above embodiments, and the plurality of sub-optical conversion regions and the plurality of sub-optical conversion regions being disposed in one-to-one correspondence.

As an example, in the holographic display device according to an embodiment of the present disclosure, the light switch layer is attached to a side of the spatial light modulator facing the optical conversion element.

In at least one embodiment of the present disclosure, there is provided a holographic display method for the holographic display device according to the above embodiments, comprising:

successively implementing modulation by the plurality of sub-spatial light modulators, to cause the holographic display device to display different frames; and successively switching on the sub-light switches corresponding to ones of the plurality of sub-spatial light modulators to which a holographic image of a current frame is loaded, and switching off the sub-light switches corresponding to the other sub-spatial light modulators.

As an example, in the holographic display method for the holographic display device according to an embodiment of the present disclosure, the backlight module provides the light source for each of the sub-spatial light modulators, and the light source is in a normally-on mode when the modulation is implemented by the plurality of sub-spatial light modulators.

BRIEF DESCRIPTION OF THE DRAWINGS

In order to illustrate the technical solutions of the embodiments of the present disclosure more clearly, the drawings for illustrating the embodiments will be briefly described below. It will be apparent that the drawings accompanied in the following description are merely illustrative of some embodiments of the present disclosure, but are not intended to limit the present disclosure.

DETAILED DESCRIPTION OF PREFERRED EMBODIMENTS

In order to make the objectives, technical solutions and advantages of the embodiments of the present disclosure more clear, the technical solutions of the embodiments of the present disclosure will now be clearly and completely described, with reference to the accompanying drawings. It will be apparent that the described embodiments are merely a part of the present disclosure, but not representative of all embodiments. All other embodiments obtained by those skilled in the art based on the described embodiments of the present disclosure without creative efforts fall within the scope of the present disclosure.

Unless otherwise defined, technical terms or scientific terms used in the present disclosure should be construed as general meanings appreciated by those skilled in the art of the present disclosure. The "first", "second" and similar words used in the present disclosure do not denote any order, quantity or importance, but are merely intended to distinguish between different constituents. The word "comprise", "include" or the like means that an element or object appearing prior to the word covers elements or objects listed behind the word and their equivalents without excluding other elements or objects. The word "connect", "join" or the like is not limited to a physical or mechanical connection, but may include an electrical connection, including a direct or indirect connection.

Figure 1:
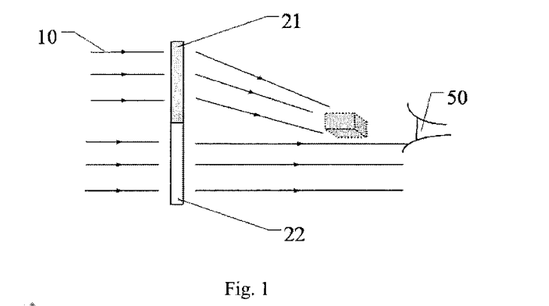
FIG. 1 is a schematic view showing that a plurality of sub-spatial light modulators are illuminated by the same reconstruction light source.
Figure 2:
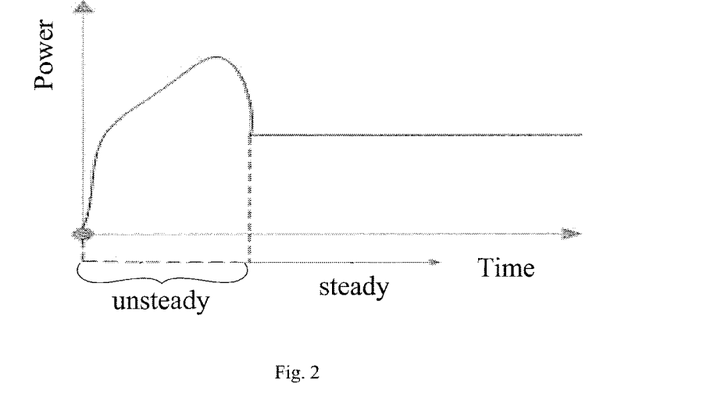
FIG. 2 is a graph showing change of power of the reconstruction light source over time.

For better display, a spatial light modulator in a holographic display device may employ a spliced spatial light modulator. The spliced spatial light modulator includes a plurality of sub-spatial light modulators arranged in an array, the sub-spatial light modulators can be independently loaded with different holographic images and display in a time division way. In such a holographic display device, the plurality of sub-spatial light modulators may have one and the same reconstruction light source, or have multiple different reconstruction light sources, which may be independently controlled according to display states of the plurality of sub-spatial light modulators. However, in the case that there is one and the same reconstruction light source, as shown in FIG. 1, the reconstruction light source is always in an illumination state, i.e., in a normally-on state, when a sub-spatial light modulator 21 is loaded with a holographic image of a current frame and a sub-spatial light modulator 22 is not loaded with the holographic image of the current frame (is not loaded with any holographic images or is being loaded with holographic images of other frames), a reconstruction light beam 10 of the reconstruction light source can pass through the sub-spatial light modulator 22, then the light beam having passed through it will adversely affect a viewing effect of human eyes 50 to view the holographic image. Alternatively, in the case that the sub-spatial light modulators respectively correspond to different independently controllable reconstruction light sources, the reconstruction light source illuminates only when a sub-spatial light modulator corresponding to the reconstruction light source is loaded with a holographic image. As shown in FIG. 2, it needs to take a period for an optical power of the reconstruction light source to be stabilized from its initiation, the optical power is unstable in an initial stage of the initiation, and then gradually stabilized. In this course, the unstable reconstruction light beam is modulated by the holographic image loaded to the sub-spatial light modulator, and then the resultant holographic image has an unstable quality, thereby resulting in deterioration of the holographic image effect.

The embodiments of the present disclosure are intended to provide a backlight module, a spatial light modulator, a holographic display device and a holographic display method therefor, so that it can avoid the poor viewing effect in case of one and the same reconstruction light source used for the plurality of sub-spatial light modulators, and avoid the unstable power and thereby poor holographic image effect due to the switch-on or switch-off of the light source in case of different independently controllable light sources used for the plurality of sub-spatial light modulators.

The embodiments of the present disclosure provide a backlight module, a spatial light modulator, a holographic display device and a holographic display method therefor. The backlight module includes a light source, an optical conversion element and a light switch layer. The optical conversion element faces the light source so as to convert a light beam emitted by the light source into a coherent collimated light beam. The light switch layer is disposed at a side of the optical conversion element away from the light source. The optical conversion element comprises a plurality of sub-optical conversion regions. The light switch layer comprises a plurality of sub-light switches. The plurality of sub-light switches and the plurality of sub-optical conversion regions are disposed in one-to-one correspondence. In this way, the light emission of the plurality of sub-optical conversion regions of the optical conversion element may be independently turned on or off by the plurality of sub-light switches, so that it can avoid the poor viewing effect in case of one and the same reconstruction light source used for the plurality of sub-spatial light modulators, and avoid the unstable power and thereby poor holographic image effect due to the switch-on or switch-off of the light source in case of different independently controllable light sources used for the plurality of sub-spatial light modulators. The spatial light modulator includes a plurality of sub-spatial light modulators and a light switch layer disposed at the light entrance side of the spatial light modulator. The light switch layer comprises a plurality of sub-light switches, the plurality of sub-light switches and the plurality of sub-spatial light modulators are disposed in one-to-one correspondence. In this way, the light incidence of the plurality of sub-spatial light modulators of the spatial light modulator may be independently turned on or off by the plurality of sub-light switches, thus the light incidence of each sub-spatial light modulator may be independently controlled in the case that one and the same light source is used. As a result, it can avoid the poor viewing effect in case of one and the same reconstruction light source used for the plurality of sub-spatial light modulators, and avoid the unstable power and thereby poor holographic image effect due to the switch-on or switch-off of the light source in case of different independently controllable light sources used for the plurality of sub-spatial light modulators. Similarly, through the holographic display device and the holographic display method therefor, it can avoid the poor viewing effect in case of one and the same reconstruction light source used for the plurality of sub-spatial light modulators, and avoid the unstable power and thereby poor holographic image effect due to the switch-on or switch-off of the light source in case of different independently controllable light sources used for the plurality of sub-spatial light modulators, and provide a good holographic display effect.

Hereinafter, a backlight module, a spatial light modulator, a holographic display device, and a holographic display method therefor according to the embodiments of the present disclosure will be described with reference to the drawings.

Figure 3:
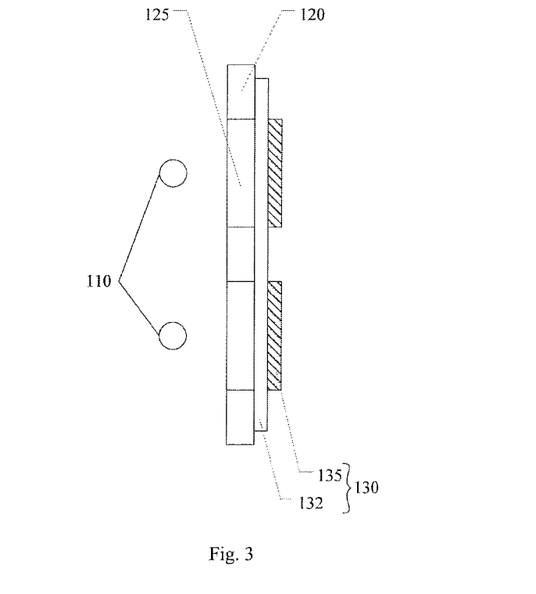
FIG. 3 is a schematic structural view of a backlight module according to an embodiment of the present disclosure.

In an embodiment of the present disclosure, there is provided a backlight module. As shown in FIG. 3, the backlight module includes a light source 110, an optical conversion element 120 and a light switch layer 130. The optical conversion element 120 faces the light source 110 so as to convert a light beam emitted by the light source 110 into a coherent collimated light beam. For example, as shown in FIG. 3, the optical conversion element 120 is disposed at a light emission side of the light source 110, and the light emitted by the light source 110 may be converted into coherent collimated light under the action of the optical conversion element 120. The light switch layer 130 is disposed at a side of the optical conversion element 120 away from the light source 110. As shown in FIG. 3, the optical conversion element 120 is disposed between the light source 110 and the light switch layer 130. The light emitted by the light source 110 firstly undergoes an action of the optical conversion element 120, then undergoes an action of the light switch layer 130. If the light switch layer 130 is in an "on" state (for example, in a transparent state), the coherent collimated light produced by the optical conversion element 120 can be emitted. If the light switch layer 130 is in an "off" state, the coherent collimated light produced by the optical conversion element 120 cannot be emitted. The optical conversion element 120 comprises a plurality of sub-optical conversion regions 125. The light switch layer 130 comprises a plurality of sub-light switches 135. The plurality of sub-optical conversion regions 125 and the plurality of sub-light switches 135 are disposed in one-to-one correspondence. It should be noted that the light source 110 described above may be an independently controlled (controlling switch-on or switch-off, luminance) light source, but the light source is not limited to one specific illuminant. For example, as shown in FIG. 3, the light source 110 includes two illuminants. Additionally, the light source may also include an array of illuminants.

For example, the light source 110 may emit coherent light, and then it is converted into coherent collimated light by the optical conversion element 120. Alternatively, the light source 110 may also emit incoherent light, and then it is converted into coherent collimated light by the optical conversion element 120.

In the backlight module according to this embodiment, the optical conversion element includes a plurality of sub-optical conversion regions so that the plurality of sub-optical conversion regions can separately convert the light emitted from the light source into the coherent collimated light, that is to say, the plurality of sub-optical conversion regions can shape the light emitted from the light source to generate reconstruction illumination light beam, so that emergent light of each of the sub-optical conversion regions can independently function as the reconstruction illumination light beam of the holographic display device. The plurality of sub-light switches and the plurality of sub-optical conversion regions are disposed in one-to-one correspondence, so that the plurality of sub-light switches can respectively control the light emission of the plurality of sub-optical conversion regions. Thus, when the backlight module is used for the holographic display device and the plurality of sub-optical conversion regions correspond to the plurality of sub-spatial light modulators, the light emission of the plurality of sub-optical conversion regions may be controlled by the plurality of sub-light switches so that the sub-spatial light modulator which is loaded with the holographic image of the current frame receives light incidence and implements the modulation to form holographic reconstruction light beam, and the sub-spatial light modulator which is not loaded with the holographic image of the current frame does not receive light incidence. As a result, it can avoid the poor viewing effect in case of one and the same reconstruction light source used for the plurality of sub-spatial light modulators, and avoid the unstable power and thereby poor holographic image effect due to the switch-on or switch-off of the light source in case of different independently controllable light sources used for the plurality of sub-spatial light modulators. In addition, the light switch layer may be of a thin film structure. In this way, it facilitates lightening and thinning the backlight module, thereby facilitating lightening and thinning the entire holographic display device.

For example, as shown in FIG. 3, the optical conversion element 120 may include a planar light guide plate.

For example, in the backlight module according to an example of this embodiment, as shown in FIG. 3, the light switch layer 130 is attached to the side of the optical conversion element 120 away from the light source 110. In this way, the light switch layer 130 can more effectively control the light emission of the optical conversion element 120.

For example, in the backlight module according to an example of this embodiment, as shown in FIG. 3, the light switch layer 130 may further include a base substrate 132, and the plurality of sub-light switches 135 are provided on the base substrate 132. For example, the base substrate 132 may be a transparent substrate, such as, a glass substrate, a quartz substrate, a plastic substrate, or the like. In this way, it facilitates the formation of the light switch layer and facilitates attaching it to the optical conversion element.

Figure 4:
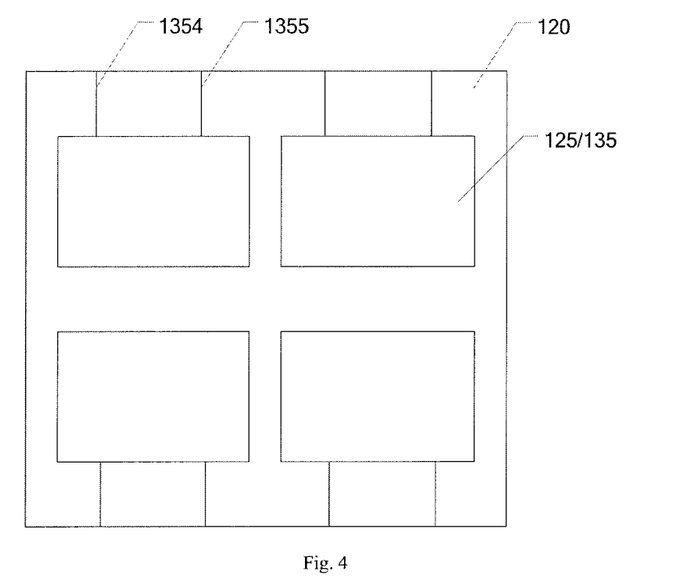
FIG. 4 is a front view of another backlight module according to an embodiment of the present disclosure.
Figure 5:
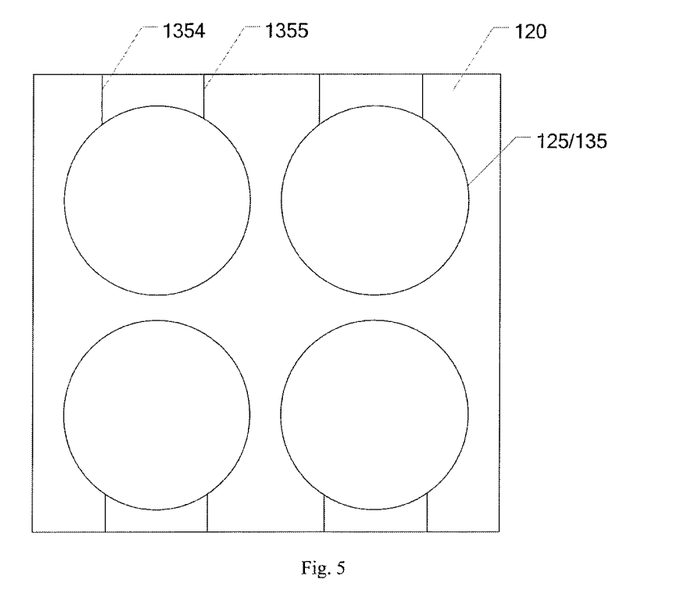
FIG. 5 is a front view of another backlight module according to an embodiment of the present disclosure.

For example, in the backlight module according to an example of this embodiment, the plurality of sub-optical conversion regions are arranged in an array in the optical conversion element, and the plurality of sub-light switches are arranged in an array in the light switch layer. FIG. 4 is a front view of a backlight module. As shown in FIG. 4, the plurality of sub-optical conversion regions 125 are arranged in an array in the optical conversion element 120, and the plurality of sub-light switches 135 are arranged in an array in the light switch layer 130. As shown in FIG. 4, the sub-optical conversion region may be rectangular. FIG. 5 is a front view of another backlight module. As shown in FIG. 5, the sub-optical conversion region is circular. Additionally, the embodiments of the present disclosure include, but are not limited to, such shapes of the sub-optical conversion region, and other shapes may be selected for the sub-optical conversion region depending on the actual situation.

Figure 6:
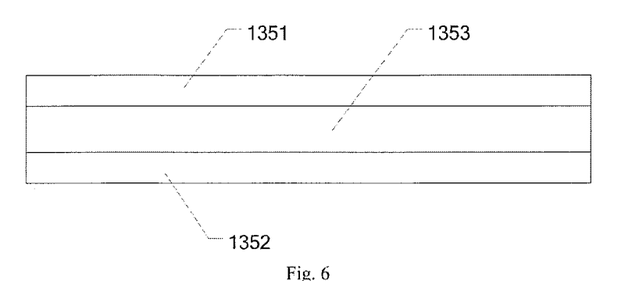
FIG. 6 is a schematic structural view of a sub-light switch in a backlight module according to an embodiment of the present disclosure.

For example, in the backlight module according to an example of this embodiment, as shown in FIG. 6, the sub-light switch 135 may include a first electrode 1351, a second electrode 1352 and an optical film layer 1353. The optical film layer 1353 is disposed between the first electrode 1351 and the second electrode 1352 and may be in an opaque state or in a transparent state under the action of an electric field between the first electrode 1351 and the second electrode 1352. When the optical film layer 1353 is in an opaque state, the light converted by the sub-optical conversion region corresponding to the sub-light switch cannot be emitted from the sub-light switch, and when the optical film layer 1353 is in a transparent state, the light converted by the sub-optical conversion region corresponding to the sub-light switch can be emitted from the sub-light switch. Since the light switch layer is of a thin film structure, it facilitates lightening and thinning the backlight module, thereby facilitating lightening and thinning the entire holographic display device.

For example, in the backlight module according to an example of this embodiment, as shown in FIGS. 4 and 5, the sub-light switch 135 may further include a first lead 1354 and a second lead 1355. The first lead 1354 and the second lead 1355 may be connected to the first electrode 1351 and the second electrode 1352 respectively and apply voltages to the first electrode 1351 and the second electrode 1352 respectively.

For example, in the backlight module according to an example of this embodiment, the optical film layer may include at least one of a liquid crystal layer and an electrochromic layer. In this way, the optical film layer can be in an opaque state or in a transparent state under the action of an electric field between the first electrode and the second electrode. Additionally, the embodiments of the present disclosure include, but are not limited to, such arrangements, and the optical film layer can be other forms of optical film layer as long as it can be in an opaque state or in a transparent state under the action of an electric field between the first electrode and the second electrode.

For example, in the backlight module according to an example of this embodiment, the light switch layer may be a flexible light switch layer to accommodate a flexible optical conversion element.

Figure 7:
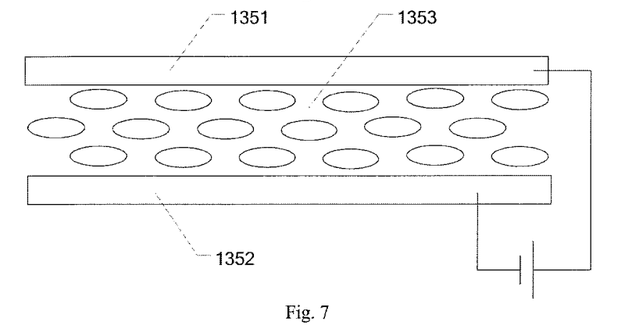
FIG. 7 is a schematic structural view of a sub-light switch in another backlight module according to an embodiment of the present disclosure.

For example, as shown in FIG. 7, the optical film layer 1353 is a liquid crystal layer. When the optical film layer includes a liquid crystal layer, the liquid crystal layer may be polymer dispersed liquid crystals.

For example, in the backlight module according to an example of this embodiment, the first electrode may be a transparent electrode and the second electrode may also be a transparent electrode. Additionally, the embodiments of the present disclosure include, but are not limited to, such arrangements, and the first and second electrodes may be other electrodes, for example, opaque metal grids. It should be noted that, in the case that the first electrode and the second electrode are metal grids, although the first electrode and the second electrode themselves are opaque, the sub-light switch can achieve the transparent state due to a larger ratio of an area of a region surrounded by metal wires in the metal grids to an area of the metal wires themselves.

Figure 8:
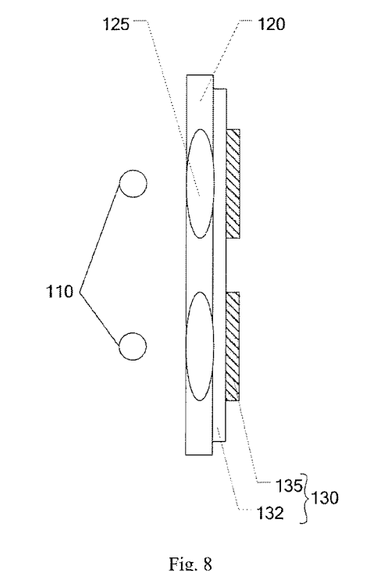
FIG. 8 is a schematic structural view of another backlight module according to an embodiment of the present disclosure.

For example, in the backlight module according to an example of this embodiment, the optical conversion element may include at least one of a planar light guide plate and a lens array. As shown in FIG. 8, the optical conversion element 120 includes a lens array, for example, each sub-optical conversion region 125 may be a lens. Additionally, the optical conversion element may comprise a planar light guide plate or a combination of a planar light guide plate and a lens array, but the embodiments of the present disclosure are not limited thereto. If the optical conversion element is a planar light guide plate, then the plurality of sub-optical conversion regions may be virtual regions; and if the optical conversion element is a lens array, the plurality of sub-optical conversion regions may be a lens array.

Figure 9:
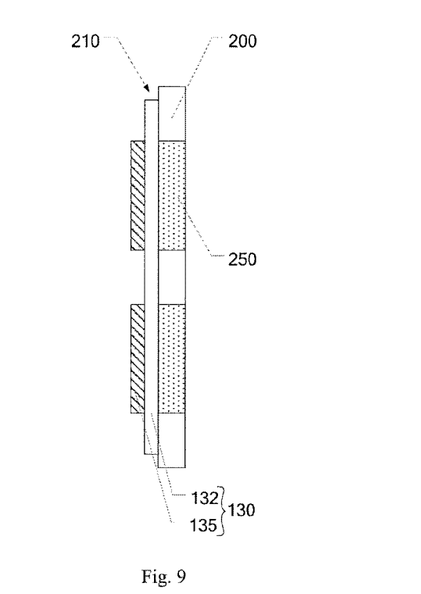
FIG. 9 is a schematic structural view of a spatial light modulator according to an embodiment of the present disclosure.

In an embodiment of the present disclosure, there is provided a spatial light modulator. As shown in FIG. 9, the spatial light modulator 200 has a light entrance side 210, and the spatial light modulator 200 can be loaded with a holographic image, to modulate the reconstruction light (for example, coherent collimated light) coming from the light entrance side 210, so that a holographic image is displayed on a side opposite to the light entrance side 210. The spatial light modulator 200 may include a plurality of sub-spatial light modulators 250 and a light switch layer 130 disposed at the light entrance side of the sub-spatial light modulators 250. The light switch layer 130 comprises a plurality of sub-light switches 135. The plurality of sub-light switches 135 and the plurality of sub-spatial light modulators 250 are disposed in one-to-one correspondence.

In the spatial light modulator according to this embodiment, the spatial light modulator includes a plurality of sub-spatial light modulators so that the plurality of sub-spatial light modulators can separately implement the modulation to display different holographic images. The plurality of sub-light switches and the plurality of sub-spatial light modulators are disposed in one-to-one correspondence, so that the plurality of sub-light switches can respectively control the light incidence of the plurality of sub-spatial light modulators. Thus, when the spatial light modulator is used for the holographic display device, the light incidence of the plurality of sub-spatial light modulators may be controlled by the plurality of sub-light switches so that the sub-spatial light modulator which is loaded with the holographic image of the current frame receives light incidence and implements the modulation, and the sub-spatial light modulator which is not loaded with the holographic image of the current frame does not receive light incidence. As a result, it can avoid the poor viewing effect in case of one and the same reconstruction light source used for the plurality of sub-spatial light modulators, and avoid the unstable power and thereby poor holographic image effect due to the switch-on or switch-off of the light source in case of different independently controllable light sources used for the plurality of sub-spatial light modulators. In addition, the light switch layer may be of a thin film structure. In this way, it facilitates lightening and thinning the spatial light modulator, thereby facilitating lightening and thinning the entire holographic display device.

For example, in the spatial light modulator according to an example of this embodiment, as shown in FIG. 9, the light switch layer 130 is attached to the light entrance side 210. Thus, the light switch layer 130 can more effectively control the light incidence of the plurality of sub-spatial light modulators 250.

For example, in the spatial light modulator according to an example of this embodiment, as shown in FIG. 9, the light switch layer 130 may further include a base substrate 132, and the plurality of sub-light switches 135 are provided on the base substrate 132. For example, the base substrate 132 may be a transparent substrate, such as, a glass substrate, a quartz substrate, a plastic substrate, or the like. In this way, it facilitates the formation of the light switch layer and facilitates attaching it to the sub-spatial light modulators.

Figure 10:
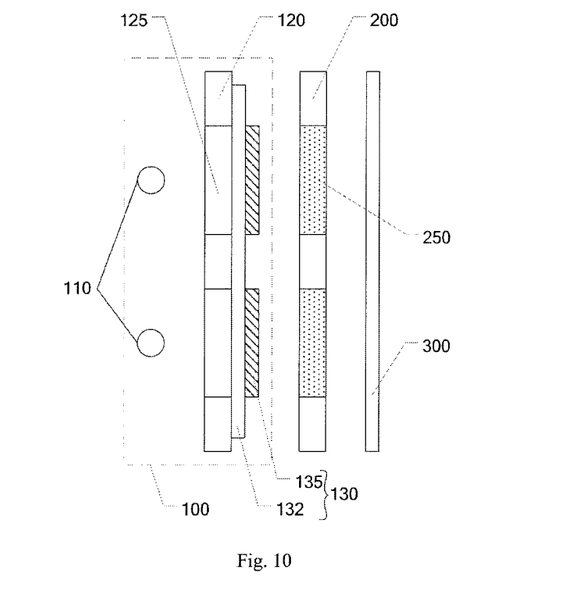
FIG. 10 is a schematic structural view of a holographic display device according to an embodiment of the present disclosure.
Figure 11:
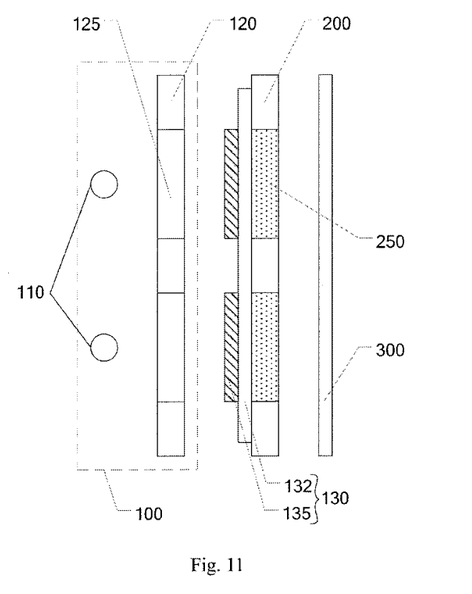
FIG. 11 is a schematic structural view of another holographic display device according to an embodiment of the present disclosure.

In an embodiment of the present disclosure, there is provided a holographic display device. As shown in FIGS. 10 and 11, the holographic display device includes a spatial light modulator 200 and a backlight module 100. The backlight module 100 faces the spatial light modulator 200 and is configured to emit coherent collimated light to the spatial light modulator 200. The spatial light modulator 200 includes a plurality of sub-spatial light modulators 250. The backlight module 100 includes a light source 110, an optical conversion element 120 and a light switch layer 130. The optical conversion element 120 faces the light source 110 so as to convert a light beam emitted by the light source 110 into coherent collimated light. The light switch layer 130 is disposed at a side of the optical conversion element 120 away from the light source 110. The optical conversion element 120 comprises a plurality of sub-optical conversion regions 125. The light switch layer 130 comprises a plurality of sub-light switches 135, and the plurality of sub-optical conversion regions 125 and the plurality of sub-light switches 135 are disposed in one-to-one correspondence. It should be noted that the light source 110 described above may be an independently controlled (controlling switch-on or switch-off, luminance) light source, but the light source is not limited to one specific illuminant. For example, as shown in FIGS. 10 and 11, the light source 110 includes two illuminants. Additionally, the light source may also include an array of illuminants.

In the holographic display device according to this embodiment, the light emitted from the light source can be separately converted into coherent collimated light by the plurality of sub-optical conversion regions of the optical conversion element, that is to say, the plurality of sub-optical conversion regions can shape the light emitted from the light source to generate reconstruction illumination light beam. The light emission of the plurality of sub-optical conversion regions or the light incidence of the plurality of sub-spatial light modulators corresponding to the plurality of sub-light switches in one-to-one relation may be respectively controlled by the plurality of sub-light switches corresponding to the plurality of sub-optical conversion regions in one-to-one relation, so that the sub-spatial light modulator which is loaded with the holographic image of the current frame receives light incidence and implements the modulation, and the sub-spatial light modulator which is not loaded with the holographic image of the current frame does not receive light incidence. As a result, it can avoid the poor viewing effect in case of one and the same reconstruction light source used for the plurality of sub-spatial light modulators, and avoid the unstable power and thereby poor holographic image effect due to the switch-on or switch-off of the light source in case of different independently controllable light sources used for the plurality of sub-spatial light modulators. In addition, the light switch layer may be of a thin film structure. In this way, it facilitates lightening and thinning the entire holographic display device.

For example, in the holographic display device according to an example of this embodiment, as shown in FIG. 10, the light switch layer 130 is attached to the side of the optical conversion element 120 away from the light source 110. In this way, the light switch layer 130 can more effectively control the light emission of the optical conversion element 120.

For example, in the holographic display device according to an example of this embodiment, as shown in FIG. 11, the light switch layer 130 may be attached to a side of the spatial light modulator 200 facing the optical conversion element 120. Thus, the light switch layer 130 can more effectively control the light incidence of the spatial light modulator 200.

For example, in the holographic display device according to an example of this embodiment, as shown in FIGS. 10 and 11, the light switch layer 130 may further include a base substrate 132, and the plurality of sub-light switches 135 are provided on the base substrate 132. For example, the base substrate 132 may be a transparent substrate, such as, a glass substrate, a quartz substrate, a plastic substrate, or the like. In this way, it facilitates the formation of the light switch layer and facilitates attaching it to the optical conversion element or the sub-spatial light modulators.

For example, in the holographic display device according to an example of this embodiment, the sub-light switch may include a first electrode, a second electrode and an optical film layer. The optical film layer is disposed between the first electrode and the second electrode and may be in an opaque state or in a transparent state under the action of an electric field between the first electrode and the second electrode. The specific configuration and effect, which will not be further described herein, can be found in the description of the foregoing embodiments.

For example, when a sub-spatial light modulator is loaded with a holographic image of a current frame at a certain time, an electric field applied between the first electrode and the second electrode in the sub-light switch corresponding to the sub-spatial light modulator may be synchronously controlled, to allow the sub-light switch to be in a transparent state, i.e., "on" state; then, the reconstruction illumination light beam which has passed through the corresponding sub-optical conversion region of the optical conversion element can pass through the sub-light switch and illuminate the holographic image on the sub-spatial light modulator, thereby it achieves the holographic reconstruction and generates the holographic reconstruction light beam. As for the other sub-spatial light modulators which are not loaded with the holographic image of the current frame, the electric field applied between the first electrode and the second electrode in the sub-light switches corresponding to these sub-spatial light modulators may be synchronously controlled, to allow the sub-light switches to be in an opaque state, i.e., "off" state; at this time, the reconstruction illumination light beam which has passed through the corresponding sub-optical conversion region of the optical conversion element cannot pass through the sub-light switches, thereby it will not adversely affect the holographic image of the current frame.

For example, as shown in FIGS. 10 and 11, the holographic display device according to an example of this embodiment further includes a deflection system 300 disposed at a side of the spatial light modulator 200 away from the backlight module 100 and configured to deflect the holographic reconstruction light beam diffracted by the plurality of sub-spatial light modulators 250 into the same display space, so as to display in the same display space in a time division way. In this way, an observer will not perceive discontinuity of holographic reconstruction images when observing the holographic reconstruction images.

Figure 12:
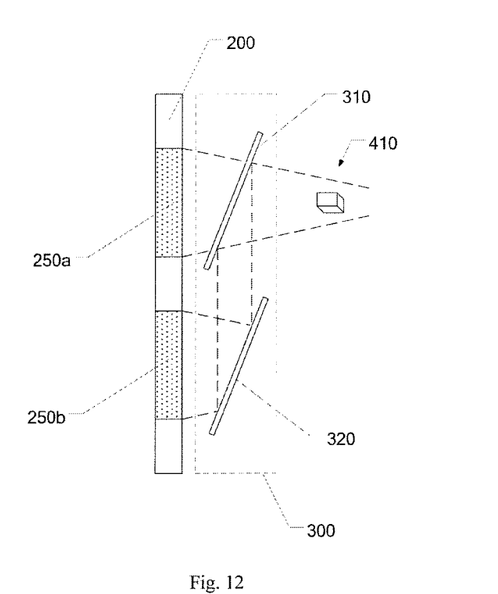
FIG. 12 is an operational schematic view of a deflection system in a holographic display device according to an embodiment of the present disclosure.

For example, the deflection system 300 may include a semi-transparent and semi-reflective mirror. As shown in FIG. 12, the deflection system 300 includes a semi-transparent and semi-reflective mirror 310 and a mirror 320. The spatial light modulator 200 includes a first sub-spatial light modulator 250a and a second sub-spatial light modulator 250b. The holographic reconstruction light beam diffracted by the first sub-spatial light modulator 250a can pass through the semi-transparent and semi-reflective mirror 310 to display in a display space 410. The holographic reconstruction light beam diffracted by the second sub-spatial light modulator 250b may be reflected by the mirror 320 and the semi-transparent and semi-reflective mirror 310 to display in the display space 410. Thus, when the first sub-spatial light modulator 250a and the second sub-spatial light modulator 250b are used to display in a time division way, the observer will not perceive discontinuity of holographic reconstruction images when she observes the holographic reconstruction images. It should be noted that the above-described example is described with reference to a spatial light modulator having two sub-spatial light modulators, however, the embodiments of the present disclosure include, but are not limited to, such arrangements. Alternatively, the spatial light modulator may include more sub-spatial light modulators, and accordingly, the deflection system may be changed according to this arrangement.

Figure 13:
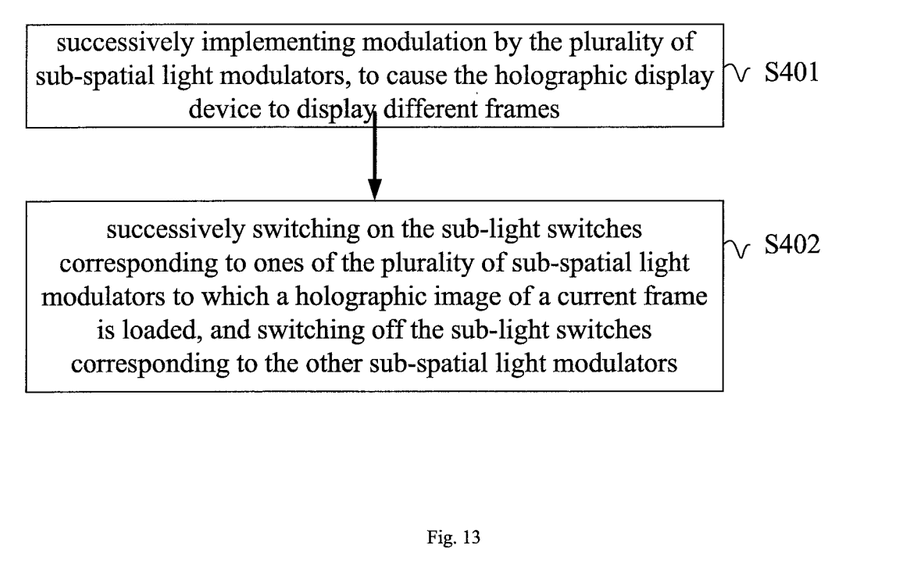
FIG. 13 is a flow chart of a holographic display method for a holographic display device according to an embodiment of the present disclosure.

In an embodiment of the present disclosure, there is provided a holographic display method for a holographic display device. The holographic display method may use the holographic display device according to any one of the above embodiments. As shown in FIG. 13, the holographic display method includes steps S401-S402.

Step S401: successively implementing modulation by the plurality of sub-spatial light modulators, to cause the holographic display device to display different frames.

Step S402: successively switching on the sub-light switches corresponding to ones of the plurality of sub-spatial light modulators to which a holographic image of a current frame is loaded, and switching off the sub-light switches corresponding to the other sub-spatial light modulators.

In the holographic display method for the holographic display device according to this embodiment, it may successively implement modulation by the plurality of sub-spatial light modulators, to cause the holographic display device to display different frames. Therefore, it can increase the number of frames of the hologram display device without increasing holographic image loading speed of the sub-spatial light modulator, thereby it makes the holographic images displayed by the holographic display device more continuous. In addition, it successively switches on the sub-light switches corresponding to ones of the plurality of sub-spatial light modulators to which a holographic image of a current frame is loaded, and switches off the sub-light switches corresponding to the other sub-spatial light modulators. In this way, the sub-spatial light modulator which is loaded with the holographic image of the current frame receives light incidence and implements the modulation to form holographic reconstruction light beam, and the sub-spatial light modulator which is not loaded with the holographic image of the current frame does not receive light incidence. As a result, it can avoid the poor viewing effect in case of one and the same reconstruction light source used for the plurality of sub-spatial light modulators, and avoid the unstable power and thereby poor holographic image effect due to the switch-on or switch-off of the light source in case of different independently controllable light sources used for the plurality of sub-spatial light modulators.

For example, in the holographic display method for the holographic display device according to an example of this embodiment, the backlight module provides the light source for each of the sub-spatial light modulators, and the light source is in a normally-on mode when the modulation is implemented by the plurality of sub-spatial light modulators. Thereby it can avoid the unstable power and thereby poor holographic image effect due to the switch-on or switch-off of the light source.

It should be noted that:

(1) In the accompanying drawings of the embodiments of the present disclosure, only the structures related to the embodiments of the present disclosure are described, and the other structures may refer to the conventional design.

(2) For clarity, in the drawings for describing the embodiments of the present disclosure, thickness and size of the layer or microstructure are enlarged. It will be appreciated that, when an element, such as a layer, a film, a region or a substrate, is described as being "on" or "below" another element, the element may be "directly" located "on" or "below" the another element, or there may be an intermediate element between these elements.

(3) In case of no conflict, the features of the same and different embodiments of the present disclosure may be combined with each other.

The above description only refers to specific embodiments of the present disclosure, but the scope of the present disclosure is not limited thereto. It is readily for the person skilled in the art to think of variations or substitutions to the present disclosure, within the technical scope disclosed in this disclosure. Such variations or substitutions fall within the scope of the present disclosure. Accordingly, the scope of the present disclosure should be defined by the appended claims.

What is claimed is:

1. A backlight module, comprising:
    a light source;
    an optical conversion element arranged to face the light source and configured to convert a light beam emitted by the light source into coherent collimated light, the optical conversion element comprises a plurality of sub-optical conversion regions, and the plurality of sub-optical conversion regions comprise a first sub-optical conversion region and a second sub-optical conversion region; and
    a light switch layer disposed at a side of the optical conversion element away from the light source, the light switch layer comprises a plurality of sub-light switches, and the plurality of sub-light switches comprise a first sub-light switch and a second sub-light switch,
    wherein the first sub-light switch is aligned with the first sub-optical conversion region in a direction of light beam transmission, and the second sub-light switch is aligned with the second sub-optical conversion region in the direction of light beam transmission; and
    wherein the first sub-light switch comprises a first electrode and a second electrode, and configured to adjust a light beam from the first sub-optical conversion region under control of the first electrode and the second electrode, and the second sub-light switch comprises a third electrode and a fourth electrode, and configured to adjust a light beam from the second sub-optical conversion region under control of the third electrode and the fourth electrode.

2. The backlight module according to claim 1, wherein the light switch layer is attached to the side of the optical conversion element away from the light source.

3. The backlight module according to claim 1, wherein the plurality of sub-optical conversion regions are arranged in an array in the optical conversion element, and the plurality of sub-light switches are arranged in an array in the light switch layer.

4. The backlight module according to claim 1, wherein the sub-light switch further comprises:
    an optical film layer disposed between the first electrode and the second electrode and configured to be in an opaque state or in a transparent state under an action of an electric field between the first electrode and the second electrode.

5. The backlight module according to claim 4, wherein the optical film layer comprises at least one of a liquid crystal layer and an electrochromic layer.

6. The backlight module according to claim 5, wherein the liquid crystal layer comprises polymer dispersed liquid crystals.

7. The backlight module according to claim 4, wherein the first electrode is a transparent electrode and the second electrode is a transparent electrode.

8. The backlight module according to claim 4, wherein the first sub-light switch further comprises a first lead and a second lead, connected to the first electrode and the second electrode respectively and configured to apply voltages to the first electrode and the second electrode respectively.

9. The backlight module according to claim 1, wherein the optical conversion element comprises at least one of a planar light guide plate and a lens array.

10. A spatial light modulator having a light entrance side, comprising:
    a plurality of sub-spatial light modulators comprising a first sub-spatial light modulator and a second sub-spatial light modulator; and
    a light switch layer disposed at the light entrance side of the spatial light modulator,
    wherein the light switch layer comprises a plurality of sub-light switches, the plurality of sub-light switches comprise a first sub-light switch and a second sub-light switch, the first sub-light switch is aligned with the first sub-spatial light modulator in a direction of light beam transmission, and the second sub-light switch is aligned with the second sub-spatial light modulator in the direction of light beam transmission, and the light switch layer is attached to the light entrance side of the spatial light modulator; and
    wherein the first sub-spatial light modulator modulates a light beam from the first sub-optical switch, and the second sub-spatial light modulator modulates a light beam from the second sub-optical switch.

11. A holographic display device, comprising:
    a spatial light modulator comprising a plurality of sub-spatial light modulators; and
    a backlight module arranged to face the spatial light modulator and configured to emit coherent collimated light to the spatial light modulator,
    wherein the backlight module is the backlight module according to claim 1, and the plurality of sub-spatial light modulators and the plurality of sub-light switches are disposed in one-to-one correspondence.

12. The holographic display device according to claim 11, wherein the light switch layer is attached to the side of the optical conversion element away from the light source.

13. The holographic display device according to claim 11, wherein the sub-light switch further comprises:
    an optical film layer disposed between the first electrode and the second electrode and configured to be in an opaque state or in a transparent state under an action of an electric field between the first electrode and the second electrode.

14. The holographic display device according to claim 11, further comprising a deflection system disposed at a side of the spatial light modulator away from the backlight module and configured to deflect a holographic reconstruction light beam diffracted by the plurality of sub-spatial light modulators into a same display space.

15. A holographic display device, comprising:
   a spatial light modulator; and
   a backlight module comprising an optical conversion element which comprises a plurality of sub-optical conversion regions,
   wherein the spatial light modulator is the spatial light modulator according to claim 10, and the plurality of sub-optical conversion regions and the plurality of sub-light switches are disposed in one-to-one correspondence.

16. The holographic display device according to claim 15, wherein the light switch layer is attached to a side of the spatial light modulator facing the optical conversion element.

17. A holographic display method for the holographic display device according to claim 11, comprising:
   successively implementing modulation by the plurality of sub-spatial light modulators, to cause the holographic display device to display different frames; and
   successively switching on the sub-light switches corresponding to ones of the plurality of sub-spatial light modulators to which a holographic image of a current frame is loaded, and switching off the sub-light switches corresponding to the other sub-spatial light modulators.

18. The holographic display method according to claim 17, wherein the backlight module provides the light source for each of the sub-spatial light modulators, and the light source is in a normally-on mode when the modulation is implemented by the plurality of sub-spatial light modulators.

19. A holographic display method for the holographic display device according to claim 15, comprising:
   successively implementing modulation by the plurality of sub-spatial light modulators, to cause the holographic display device to display different frames; and
   successively switching on the sub-light switches corresponding to ones of the plurality of sub-spatial light modulators to which a holographic image of a current frame is loaded, and switching off the sub-light switches corresponding to the other sub-spatial light modulators.

20. The holographic display method according to claim 19, wherein the backlight module provides the light source for each of the sub-spatial light modulators, and the light source is in a normally-on mode when the modulation is implemented by the plurality of sub-spatial light modulators.

* * * * *